United States Patent
Speck et al.

(10) Patent No.: US 6,604,034 B1
(45) Date of Patent: Aug. 5, 2003

(54) DEVICE FOR THE SUSPENSION AND FOR ROLL-STABILIZATION OF MOTOR VEHICLES

(75) Inventors: Frank-Detlef Speck, Friedrichshafen (DE); Ünal Gazyakan, Friedrichshafen (DE)

(73) Assignee: ZF Lenksysteme GmbH, Schwäbisch Gmünd (DE)

( * ) Notice: Subject to any disclaimer, the term of this patent is extended or adjusted under 35 U.S.C. 154(b) by 0 days.

(21) Appl. No.: 09/856,668

(22) PCT Filed: Nov. 17, 1999

(86) PCT No.: PCT/EP99/08839

§ 371 (c)(1),
(2), (4) Date: Jul. 5, 2001

(87) PCT Pub. No.: WO00/30879

PCT Pub. Date: Jun. 2, 2000

(30) Foreign Application Priority Data

Nov. 23, 1998 (DE) .......................................... 198 53 873

(51) Int. Cl.[7] .............................................. B60G 23/00
(52) U.S. Cl. .............. 701/37; 280/124.06; 280/124.01; 280/5.5; 280/5.506
(58) Field of Search .............. 701/37, 38; 280/124.106, 280/5.506, 124.1, 678, 683

(56) References Cited

U.S. PATENT DOCUMENTS 3,871,635 A * 3/1975 Unruh et al. ................. 267/11
4,607,861 A * 8/1986 Eisenberg et al. .......... 267/186

FOREIGN PATENT DOCUMENTS

| DE | 1 176 693 | 8/1964 |
|----|-----------|--------|
| DE | 19 47 232 | 4/1971 |
| DE | 20 48 323 | 4/1972 |
| DE | 2 223 250 | 11/1972 |
| DE | 32 47 391 | 6/1984 |
| DE | 39 36 987 | 5/1991 |
| DE | 41 13 736 | 10/1991 |
| DE | 41 15 717 | 11/1991 |
| DE | 41 33 725 | 4/1993 |
| DE | 197 01 760 | 7/1997 |
| EP | 0 201 425 | 12/1986 |
| EP | 0 536 707 | 4/1993 |
| FR | 2 503 461 | 10/1982 |

* cited by examiner

Primary Examiner—Thomas G. Black
Assistant Examiner—Arthur D. Donnelly
(74) Attorney, Agent, or Firm—Kenyon & Kenyon

(57) ABSTRACT

A device for the suspension and for roll stabilization of motor vehicles achieves the required roll stiffness as well as the required lift stiffness without any additional springs by coordinating the ratio of the piston areas to the piston ring areas of the spring cylinders with simultaneous active engagement by an actuator integrated between the cross-wired lines.

4 Claims, 2 Drawing Sheets

DEVICE FOR THE SUSPENSION AND FOR ROLL-STABILIZATION OF MOTOR VEHICLES

FIELD OF THE INVENTION

The present invention relates to a device for the suspension and for roll stabilization of motor vehicles.

BACKGROUND INFORMATION

Active chassis systems which operate in conjunction with a hydropneumatic suspension and displace hydraulic medium from the hydropneumatic spring struts on one side of the vehicle to the hydropneumatic spring struts on the other side of the re vehicle through one or more displacement units in order to thereby influence the rolling angle of the vehicle body are conventional. In these systems, a hydropneumatic suspension replaces either a conventional vehicle suspension or its stabilizers.

A system in which a hydropneumatic suspension replaces a conventional suspension in a vehicle body is described, for example, in German Published Patent Application No. 39 36 987.

This system is characterized by the fact that it actively counteracts rolling and pitching motions of the vehicle by actively displacing hydraulic medium directly between the support elements on different sides of a vehicle or between front and rear support units in order to raise one side of the vehicle while at the same time lowering the other side or to move the front part of the vehicle in the opposite direction from the rear end accordingly. However, one disadvantage of this system is that additional stabilizers are needed to guarantee the required passive roll stiffness of the vehicle and thus safe operation of the vehicle.

German Published Patent Application No. 20 48 323 describes a device for the stabilization of the vehicle superstructure against a curve gradient in which a hydropneumatic suspension replaces the stabilizers, and a pressure medium is conveyed as a function of the cornering directly to the pistons of cylinder-piston units, in particular hydropneumatic springs, which are connected between the wheels and the vehicle superstructure, so that the cylinder-piston unit allocated to the wheel on the inside of the curve is shortened in the sense of lowering the vehicle superstructure, and the cylinder-piston unit allocated to the wheel on the outside of the curve is lengthened in the sense of raising the vehicle superstructure.

One disadvantage of the device described in German Published Patent Application No. 20 48 323 is that additional add-on springs are required, but they have a negative effect on the overall roll stiffness of the vehicle. In addition, another negative effect of both devices described above is that other passive suspension elements are present in the vehicle in addition to the active hydropneumatics, resulting in a passive roll stiffness against which an active device must work, but this is unfavorable from an energy standpoint.

It is therefore an object of the present invention to provide an active device for the suspension and for roll stabilization of motor vehicles so that additional springs and stabilizers are not necessary.

SUMMARY

The above and other beneficial objects of the present invention are achieved by providing a device for the suspension and for roll stabilization of motor vehicles as described herein.

Through specific coordination of piston surfaces and piston ring surfaces in combination with an active displacement unit, the hydropneumatic device for the suspension and for roll stabilization of motor vehicles can yield the full required vertical and roll stiffness simultaneously. This hydropneumatic device for the suspension and for roll stabilization of motor vehicles thus provides the complete suspension of the vehicle, so that no additional springs or stabilizers are needed, which thus offers advantages with regard to cost, weight and installation space in addition to the energy benefit.

DETAILED DESCRIPTION

Figure 1:
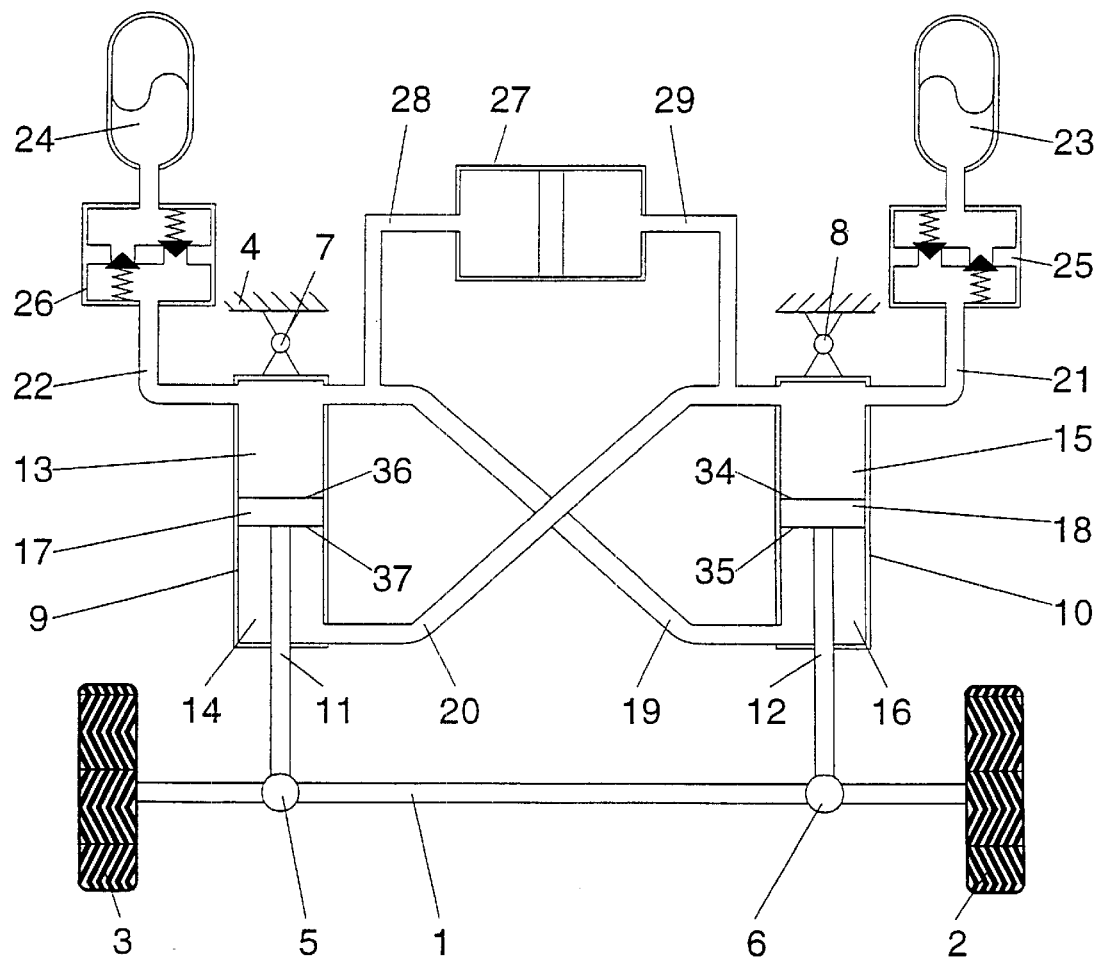
FIG. 1 is a schematic view of an active hydropneumatic suspension system.

FIG. 1 illustrates an active hydropneumatic suspension having a rigid axle 1 and vehicle wheels 2 and 3 mounted on this axle. Dual tires may also be used instead of vehicle wheels 2 and 3, and any other wheel suspension may be used instead of rigid axle 1. Rigid axle 1 is connected to a vehicle body 4 by articulated joints 5, 6 on the axle and articulated joints 7, 8 on the body by two spring cylinders 9 and 10. Spring cylinder 9 is coupled to rigid axle 1 with a piston rod 11 in articulated joint 5. A piston rod 12 of spring cylinder 10 engages in articulated joint 6 of rigid axle 1. Each spring cylinder 9 and 10 includes an upper spring cylinder space 13 and 15 and a lower spring cylinder space 14 and 16. Spring cylinder spaces 13 and 14 are separated by an isolating piston 17, and spring cylinder spaces 15 and 16 are separated by an isolating piston 18. A line 19 connects upper spring cylinder space 13 of spring cylinder 9 to lower spring cylinder space 16 of spring cylinder 10. In the same way, a line 20 connects upper spring cylinder space 15 of spring cylinder 10 to lower spring cylinder space 14 of spring cylinder 9. The double-chamber cylinders are cross-wired together by lines 19 and 20.

A hydraulic accumulator 23 and 24 is connected to each line 19 and 20 over lines 21 and 22. Damping elements 25 and 26 provided in lines 21 and 22 also dampen rolling motions.

An actuator 27 is connected to lines 19 and 20 over lines 28 and 29. This actuator 27 is a control device or a displacement device which makes it possible to create active rolling moments. The actuator displaces medium from one side of the vehicle to the other, thus achieving roll stabilization.

Figure 2:
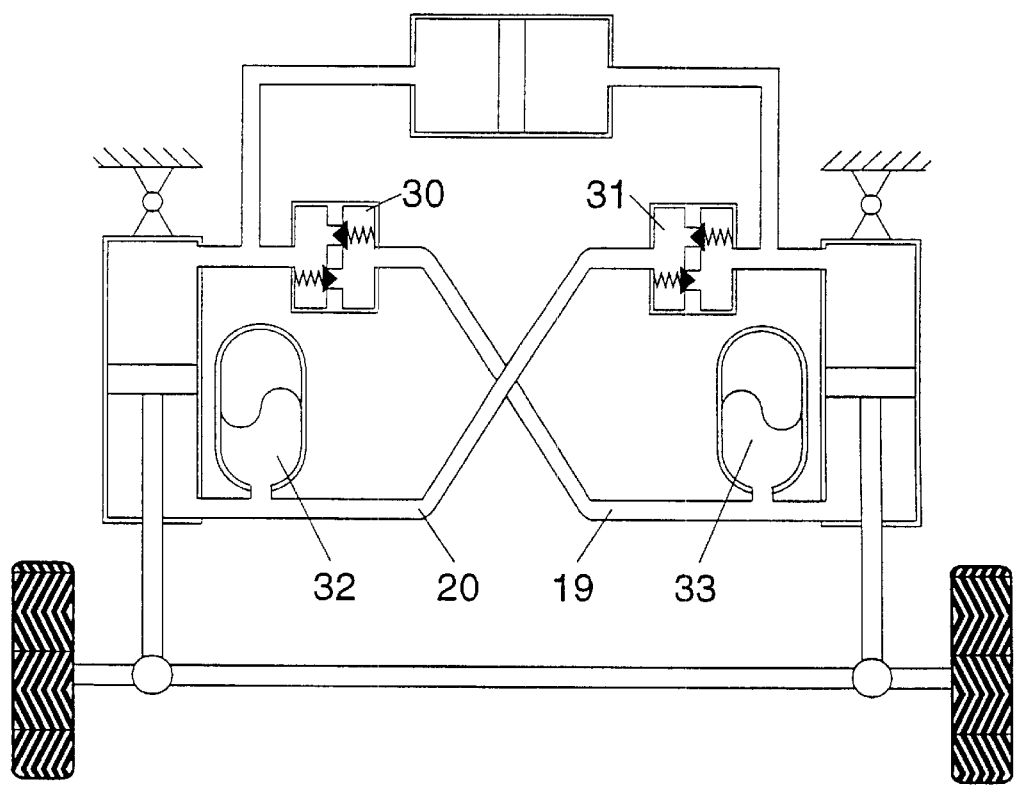
FIG. 2 is a schematic view of an example embodiment of a device for suspension and roll stabilization of a motor vehicle according to the present invention.

In the device illustrated in FIG. 2 for the suspension and for roll stabilization of motor vehicles, damping elements 30 and 31 and storage cylinders 32 and 33 are integrated into cross-wired lines 19 and 20.

The overall stiffness of the device for the suspension and for roll stabilization of motor vehicles is composed of the vertical and roll stiffness of rigid axle 1. The following equation represents vertical stiffness $k_H$ of rigid axle 1:

$$k_H = 2 \cdot n \cdot (A_K - A_R)^2 \cdot \frac{P}{V},$$

and roll stiffness $k_W$ of rigid axle 1 is calculated according to the equation:

$$k_W = \frac{1}{2} \cdot s^2 \cdot n \cdot (A_K + A_R)^2 \cdot \frac{P}{V}.$$

where n is the polytropic exponent, $A_K$ denotes a piston area 34, 36, $A_R$ denotes a piston ring area 35, 37, p is the pressure in a hydraulic accumulator 23, 24, V is the gas volume of hydraulic accumulator 23, 24 and s is the wheel base of axle 1.

The required vertical and roll stiffness of the entire device for the suspension and for roll stabilization of motor vehicles may be achieved by designing the dimensions of piston areas 34, 36 and piston ring areas 35, 37 in the following ratio:

$$\frac{A_K}{A_R} = \frac{2 \cdot \sqrt{k_W} + s \cdot \sqrt{k_H}}{2 \cdot \sqrt{k_W} - s \cdot \sqrt{k_H}}.$$

Reference Numbers 1 rigid axle
2 vehicle wheel
3 vehicle wheel
4 vehicle body
5 articulated joint
6 articulated joint
7 articulated joint
8 articulated joint
9 spring cylinder
10 spring cylinder
11 piston rod
12 piston rod
13 upper spring cylinder space
14 lower spring cylinder space
15 upper spring cylinder space
16 lower spring cylinder space
17 isolating piston
18 isolating piston
19 line
20 line
21 line
22 line
23 storage cylinder
24 storage cylinder
25 damping element
26 damping element
27 actuator
28 line
29 line
30 damping element
31 damping element
32 storage cylinder
33 storage cylinder
34 piston area
35 piston ring area
36 piston area
37 piston ring area

What is claimed is:

1. A device for roll stabilization and suspension of a motor vehicle, the motor vehicle including at least one vehicle wheel, comprising:

an active suspension system acted upon by a pressure medium, each vehicle wheel being connected to a body of the motor vehicle via the active suspension system, the active suspension system including:
a plurality of spring cylinders, piston areas and ring areas of the spring cylinders being configured in a ratio so that additional stabilizers and springs are unnecessary;
lines cross-connecting the spring cylinders via damping elements and hydraulic accumulators provided in the lines; and
an actuator connecting the cross-connected lines.

2. The device according to claim 1, wherein the ratio of piston areas and ring areas is determined in accordance with the following equation:

$$\frac{A_K}{A_R} = \frac{2 \cdot \sqrt{k_W} + s \cdot \sqrt{k_H}}{2 \cdot \sqrt{k_W} - s \cdot \sqrt{k_H}},$$

wherein $A_k$ represents one of the piston areas, $A_R$ represents a corresponding one of the ring areas, s represents a wheel base, $k_W$ represents a roll stiffness, and $k_H$ represents a lift stiffness.

3. The device according to claim 2, wherein the lift stiffness $k_H$ is determined in accordance with the following equation:

$$k_H = 2 \cdot n \cdot (A_K - A_R)^2 \cdot \frac{P}{V},$$

wherein P represents a pressure of at least one storage cylinder, V represents a gas volume of the at least one storage cylinder, and n represents a polytropic exponent.

4. The device according to claim 2, wherein the roll stiffness $k_W$ is determined in accordance with the following equation:

$$k_W = \frac{1}{2} \cdot s^2 \cdot n \cdot (A_K + A_R)^2 \cdot \frac{P}{V},$$

wherein P represents a pressure of at least one storage cylinder, V represents a gas volume of the at least one storage cylinder, and n represents a polytropic exponent.

* * * * *